United States Patent
Breymann et al.

(10) Patent No.: US 11,263,257 B2
(45) Date of Patent: Mar. 1, 2022

(54) TECHNIQUES FOR AUTOMATICALLY EXPOSING 3D PRODUCTION ASSETS TO AN EDITORIAL WORKSTATION IN A CONTENT CREATION PIPELINE

(71) Applicant: DISNEY ENTERPRISES, INC., Burbank, CA (US)

(72) Inventors: Michael Breymann, San Francisco, CA (US); Evan A. Binder, Los Angeles, CA (US); Anthony M. Accardo, Los Angeles, CA (US); Katharine S. Navarre, Santa Monica, CA (US); Avner Swerdlow, Los Angeles, CA (US); Miquel Angel Farre Guiu, Bern (CH)

(73) Assignee: Disney Enterprises, Inc., Burbank, CA (US)

( * ) Notice: Subject to any disclaimer, the term of this patent is extended or adjusted under 35 U.S.C. 154(b) by 338 days.

(21) Appl. No.: 16/267,335

(22) Filed: Feb. 4, 2019

(65) Prior Publication Data
US 2020/0183968 A1 Jun. 11, 2020

Related U.S. Application Data

(60) Provisional application No. 62/777,022, filed on Dec. 7, 2018.

(51) Int. Cl.
*G06F 16/54* (2019.01)
*G06T 19/00* (2011.01)
*G06T 1/20* (2006.01)
*G06F 16/583* (2019.01)

(52) U.S. Cl.
CPC ............ *G06F 16/54* (2019.01); *G06F 16/583* (2019.01); *G06T 1/20* (2013.01); *G06T 19/00* (2013.01)

(58) Field of Classification Search
None
See application file for complete search history.

(56) References Cited

U.S. PATENT DOCUMENTS

2009/0217352 A1* 8/2009 Shen ................... G06F 21/6218
726/3
2019/0236152 A1* 8/2019 Sacilotto, Jr. ........ H04N 21/858

* cited by examiner

*Primary Examiner* — Yi Wang
(74) *Attorney, Agent, or Firm* — Artegis Law Group, LLP

(57) ABSTRACT

Various embodiments of the invention disclosed herein provide techniques for automatically exposing 3D production assets to an editorial workstation in a content creation pipeline. A production asset management system transmits, to an editorial workstation, a first content library that includes first metadata associated with a 3D production asset that is included in an editorial cut. The first metadata allows a user to see what versions of the 3D production asset are available for incorporation into the editorial cut. The production asset management system retrieves second metadata associated with a second version of the 3D production asset from a production database. The production asset management system retrieves, based on the second metadata, the second version of the 3D production asset from the production database. The production asset management system transmits the second version of the 3D production asset to the editorial workstation for incorporation into the editorial cut.

20 Claims, 8 Drawing Sheets

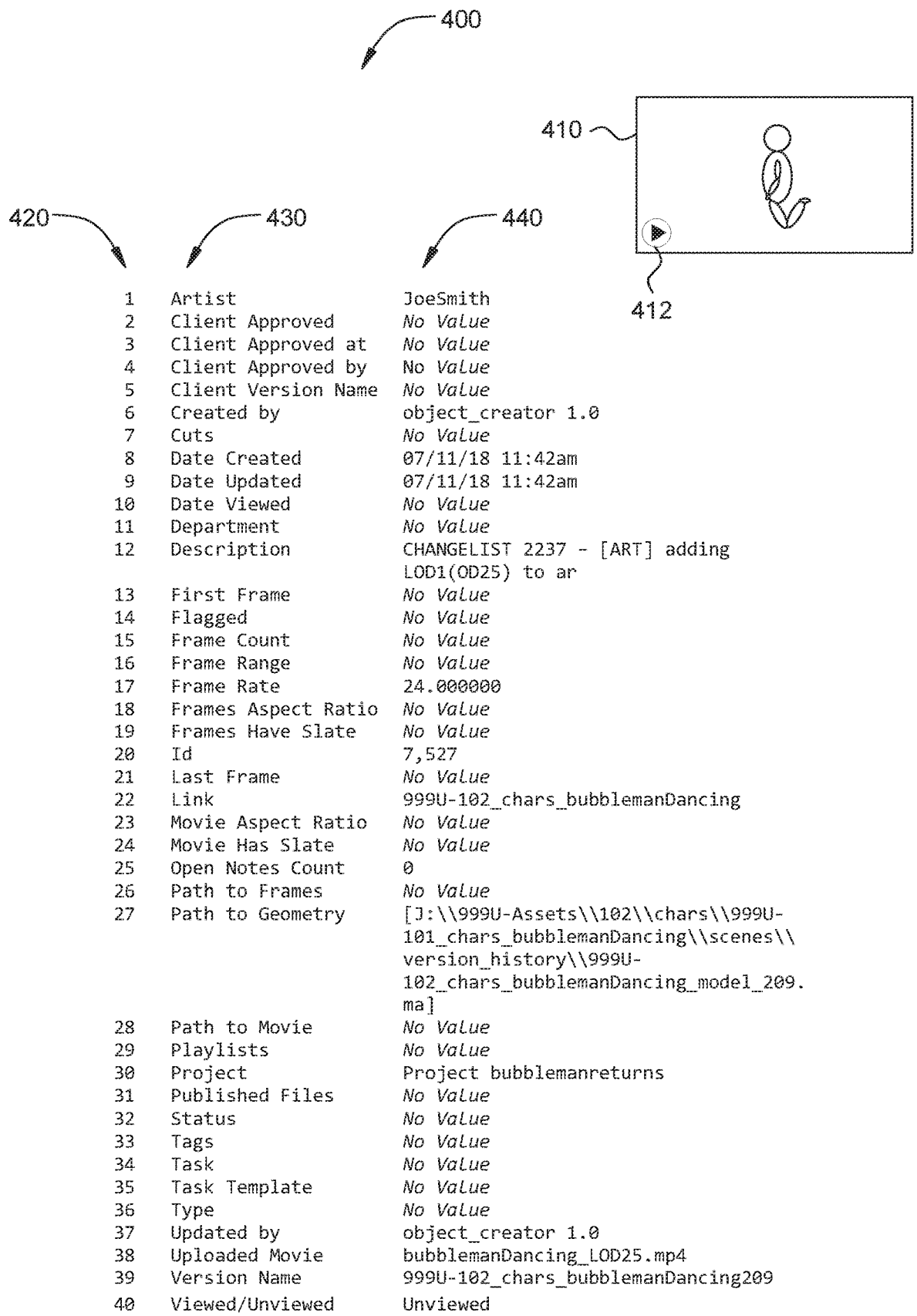

|    |                      |                                                                                                                              |
|----|----------------------|------------------------------------------------------------------------------------------------------------------------------|
| 1  | Artist               | JoeSmith                                                                                                                     |
| 2  | Client Approved      | No Value                                                                                                                     |
| 3  | Client Approved at   | No Value                                                                                                                     |
| 4  | Client Approved by   | No Value                                                                                                                     |
| 5  | Client Version Name  | No Value                                                                                                                     |
| 6  | Created by           | object_creator 1.0                                                                                                           |
| 7  | Cuts                 | No Value                                                                                                                     |
| 8  | Date Created         | 07/11/18 11:42am                                                                                                             |
| 9  | Date Updated         | 07/11/18 11:42am                                                                                                             |
| 10 | Date Viewed          | No Value                                                                                                                     |
| 11 | Department           | No Value                                                                                                                     |
| 12 | Description          | CHANGELIST 2237 - [ART] adding LOD1(OD25) to ar                                                                              |
| 13 | First Frame          | No Value                                                                                                                     |
| 14 | Flagged              | No Value                                                                                                                     |
| 15 | Frame Count          | No Value                                                                                                                     |
| 16 | Frame Range          | No Value                                                                                                                     |
| 17 | Frame Rate           | 24.000000                                                                                                                    |
| 18 | Frames Aspect Ratio  | No Value                                                                                                                     |
| 19 | Frames Have Slate    | No Value                                                                                                                     |
| 20 | Id                   | 7,527                                                                                                                        |
| 21 | Last Frame           | No Value                                                                                                                     |
| 22 | Link                 | 999U-102_chars_bubblemanDancing                                                                                              |
| 23 | Movie Aspect Ratio   | No Value                                                                                                                     |
| 24 | Movie Has Slate      | No Value                                                                                                                     |
| 25 | Open Notes Count     | 0                                                                                                                            |
| 26 | Path to Frames       | No Value                                                                                                                     |
| 27 | Path to Geometry     | [J:\\999U-Assets\\102\\chars\\999U-101_chars_bubblemanDancing\\scenes\\version_history\\999U-102_chars_bubblemanDancing_model_209.ma] |
| 28 | Path to Movie        | No Value                                                                                                                     |
| 29 | Playlists            | No Value                                                                                                                     |
| 30 | Project              | Project bubblemanreturns                                                                                                     |
| 31 | Published Files      | No Value                                                                                                                     |
| 32 | Status               | No Value                                                                                                                     |
| 33 | Tags                 | No Value                                                                                                                     |
| 34 | Task                 | No Value                                                                                                                     |
| 35 | Task Template        | No Value                                                                                                                     |
| 36 | Type                 | No Value                                                                                                                     |
| 37 | Updated by           | object_creator 1.0                                                                                                           |
| 38 | Uploaded Movie       | bubblemanDancing_LOD25.mp4                                                                                                   |
| 39 | Version Name         | 999U-102_chars_bubblemanDancing209                                                                                           |
| 40 | Viewed/Unviewed      | Unviewed                                                                                                                     |

FIGURE 4

{} 999U-102_chars_ bubblemanDancing_model_209_metadata.json

```
1   {
2       "Header":  {
3           "project": "bubblemanreturns",
4           "company": "Acme Pictures",
5           "episode": "102",
6           "job": "999U"
7       },
8       "AssetInfo": {
9           "sg_entity": "Asset",
10          "world_units": "meter",
11          "MaterialInfo": {
12              "normal": "TEX_normal_map",
13              "color": "TEX_color_map",
14              "emissive": "TEX_emissive_map",
15              "AO": "TEX_ao_map",
16              "metallic": "TEX_ metallic _map",
17              "roughness": "TEX_ roughness _map"
18          },
19          "timestamp": "2018-07-11 14:36:51.645000",
20          "asset_name": "999U-102_chars_bubblemanDancing",
21          "user": "JoeSmith",
22          "frame_range": [
23              "0.0",
24              "150.0"
25          ],
26          "LOD_levels": [
27              "LOD75",
28              "LOD25",
29              "LOD025"
30          ],
31          "id": "1432",
32          "task": [
33              "LOD25 Asset"
34          ],
35          "source_path": [
36              "J:\\999U-Assets\\102\\chars\\999U-
                101_chars_bubblemanDancing \\scenes\\
                version_history\\999U-
                102_chars_bubblemanDancing_model_209.ma"
37          ],
38          "asset_category": "chars",
39          "version": "209",
40          "role": "model",
41          "fps": "30"
42      }
43  }
```

FIGURE 5

TECHNIQUES FOR AUTOMATICALLY EXPOSING 3D PRODUCTION ASSETS TO AN EDITORIAL WORKSTATION IN A CONTENT CREATION PIPELINE

CROSS-REFERENCE TO RELATED APPLICATIONS

This application claims the benefit of the United States provisional patent application titled, "TECHNIQUES FOR CONTENT LIBRARIES IN ANIMATED PRODUCTIONS," filed on Dec. 7, 2018 and having Ser. No. 62/777,022. The subject matter of this related application is hereby incorporated herein by reference.

BACKGROUND OF THE INVENTION

Field of the Invention

The present invention relates generally to distributed media production and, more specifically, to techniques for automatically exposing 3D production assets to an editorial workstation in a content creation pipeline.

Description of the Related Art

Media productions, also referred to herein as "productions," can include any form of audio and video content for use in feature films, computer games, television broadcast, commercials, online media, and so on. Media productions typically involve live action, animation, or a mix of live action and animation. Media productions that involve animation often include two-dimensional (2D) and three-dimensional (3D) computer-generated production assets (also referred to herein as "elements"), where each such asset contributes a visual and/or audio component to the media production. Such production assets can include computer-generated characters, virtual sets, light sources, and virtual cameras.

Production assets used in media productions typically are generated by members of a production team that can include computer artists, animators, lighting designers, set designers, and so on. Production assets usually are generated in an iterative fashion, where one or more production team members generate an initial version of a production asset and then modify that production asset multiple times before finalizing the production asset for use in a given media production.

The editorial process, also referred to herein as "editorial," is the stage of production where content emerges as a story. A traditional content creation pipeline typically proceeds through a series of steps includes generating 3D production assets, assembling the 3D production assets into a scene, rendering the scene as a sequence of 2D frames, conforming to the edit of the production through a versioning process, and then delivering the rendered scene to editorial staff for approval. The scene delivered to editorial staff is referred to herein as an "editorial cut." Various steps of this process are performed by production coordinators who communicate directly with the production team, production management, and editorial staff.

In a typical content creation pipeline, each editorial cut is delivered to the editorial staff in the form of scene representations of 3D production assets that have been pre-rendered or "baked" into a 2D frame or sequences of frames. When generating and rendering an editorial cut, the production content is transformed from 3D digital production assets to a 2D rendered video clip, as facilitated by production coordinators and department leads. When reviewing an editorial cut, the editorial staff compiles various notes about the editorial cut and communicates these notes back upstream to the production team. Based on the notes from the editorial staff, the production team modifies the production assets accordingly and generates new rendered versions of the editorial cuts for subsequent review. This process is continually performed in an iterative fashion until the editorial staff gives final approval for each of the editorial cuts in the production.

One drawback to the iterative design and review process described above is that, because the editorial cuts include only 2D rendered frames, the editorial staff is unable to access individual 3D production assets that are included in the frames of the editorial cut. In general, the software applications available to the editorial staff cannot access or modify individual elements included in the editorial cut. Instead, those software applications can only view the rendered clip as a single entity and are not able to access any information on the 3D production assets that are depicted in the editorial cut. Consequently, the editorial staff is generally limited to approving or rejecting an editorial cut as a single entity. If the editorial staff wants to make changes in the editorial cut, the editorial staff can only generate production notes on how the scene is to be modified for the subsequent version of the editorial cut. Then the editorial staff must wait for the production team to modify one or more production assets within the scene according to the notes, render the editorial cut with the new production assets, and then deliver the subsequent version of the editorial cut. Each cycle of receiving an editorial cut, rejecting the cut and generating production notes, and waiting for the subsequent editorial cut to be delivered is time consuming and labor intensive, resulting in inefficiencies that can increase costs and cause production delays.

As the foregoing illustrates, what is needed in the art are more effective techniques for accessing and editing production assets in a content creation pipeline.

SUMMARY OF THE INVENTION

Various embodiments of the present application set forth a computer-implemented method for automatically exposing 3D production assets to an editorial workstation in a content creation pipeline. The method includes transmitting, to an editorial workstation, a 3D production asset, or collection of 3D production assets, and a content library that includes first metadata, or collection of metadata, associated with the 3D production asset, wherein a first version of the 3D production asset is included in an editorial cut, and the first metadata allows a user to see what versions of the 3D production asset are available for incorporation into the editorial cut. The method further includes transmitting retrieving second metadata associated with a second version of the 3D production asset from a production database. The method further includes retrieving, based on at least a portion of the second metadata, the second version of the 3D production asset from the production database. The method further includes transmitting the second version of the 3D production asset to the editorial workstation for incorporation into the editorial cut.

Other embodiments of the present invention include, without limitation, a computer-readable medium including instructions for performing one or more aspects of the disclosed techniques, as well as a computing device for performing one or more aspects of the disclosed techniques.

At least one technical advantage of the disclosed techniques relative to the prior art is that, with the disclosed techniques, editorial cuts include 3D data and metadata for each of the 3D production assets included in the editorial cut. Therefore, the editorial staff can access each of the individual 3D production assets included in an editorial cut, rather than being limited to having access only to 2D rendered frames. As a result, the editorial staff can directly review and exchange different versions of individual 3D production assets during editorial review. Further, the editorial staff can search for and add new 3D production assets to an editorial cut that are not already in the cut by directly accessing the 3D production assets from a production database. Using a specialized user interface, editorial staff can then separately access and combine different versions of the 3D production assets included in an editorial cut. Thus, the editorial staff is relieved from having to communicate with or involve other members of the production team when changing which 3D production assets, versions of 3D production assets, or combinations thereof, which are included in a given editorial cut. Further, the production team is relieved from having to generate a 2D rendered layer for the 3D production assets to composite into the editorial cut. As a result, the editorial review process is made more efficient and less labor intensive relative to prior art approaches. Accordingly, these advantages represent one or more technological improvements over prior art approaches.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 illustrates an exemplary metadata set for a production asset that is related to an editorial cut, according to various embodiments of the present invention;

FIG. 5 illustrates another exemplary metadata set for a production asset that is related to an editorial cut, according to various other embodiments of the present invention;

DETAILED DESCRIPTION

Figure 1:
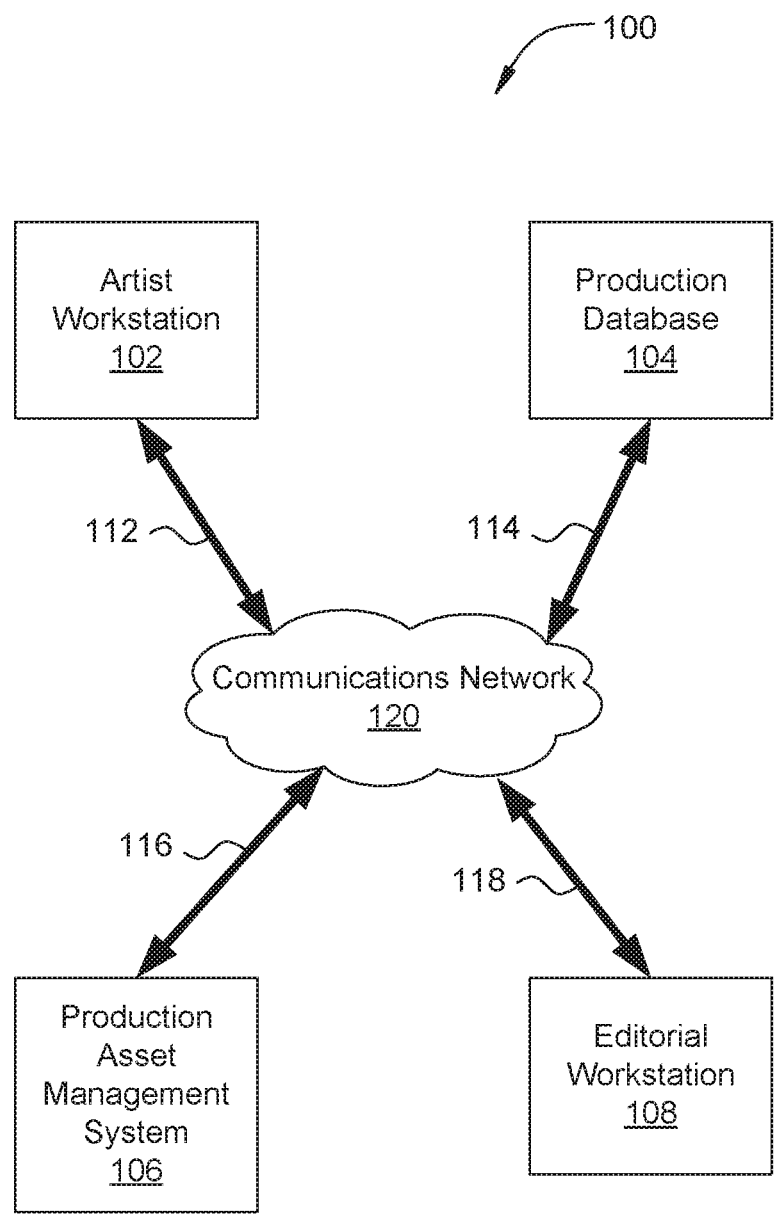
FIG. 1 illustrates a system configured to implement one or more aspects of the present invention.

In the following description, numerous specific details are set forth to provide a more thorough understanding of the embodiments of the present invention. However, it will be apparent to one of skill in the art that the embodiments of the present invention may be practiced without one or more of these specific details.

The current state of real-time editorial production is generally underdeveloped, combining some aspects of game development with a nonlinear editorial interface adopted from the film and television industries. Production content is transmitted directly into the nonlinear editor as 3D data, which allows an editor, assistant director, 3D editorial operator, or other professional to more directly select and manipulate individual production assets. For purposes of comprehension, such an editor, assistant director, 3D editorial operator, or other professional is referred to herein as a "user." However, due to limitations in currently available production tools, choices regarding how that production content is delivered into the editor are still made by production management. As a result, current solutions generally limit the ability to manipulate production assets and make revisions in editorial, leading to inefficiencies in the content-creation pipeline.

In various embodiments, a real-time content creation pipeline includes an editorial workstation that executes a software application program. The editorial software application program may exist as a standalone executable program or may be integrated and incorporated into one or more other software application programs. The editorial workstation manages various versions of production assets, scene objects, and other published content. The editorial workstation organizes the versions of production assets, scene objects, and other published content into a data stream, referred to herein as an "asset list." The asset list is a list of assets that streams from the real-time editorial software, based on the production assets in the current edit. The asset list is constructed from a real-time engine that includes information about the state of the scene at a specified moment in the editorial timeline. This streaming data is generated from a plugin or application program that queries the scene of the editing application for published production assets, scene objects, and other content. A corresponding plugin or application, herein referred to as the "production asset management system" receives the streaming data and then matches the asset list to the known published versions of each production asset, scene object, and other content based on information retrieved from a production database.

The editorial workstation displays each known published version of each production asset, scene object, and other content included in the asset list as a selectable list, where each listed item may be individually imported into the editorial workstation. This selectable list is referred herein as a "content library." The content library" is an asset list that is returned from a query to the production database. The content library includes all available versions and variants of the production assets, as well as other rich information about the context regarding each version and variant that was created—such as artist name, publish time, etc. In this manner, a user may select and assemble the appropriate versions of all published 3D production assets, scene objects, and other content. Upon retrieving and assembling the desired versions of the published 3D production assets, scene objects, and other content, the editorial workstation displays the updated scene in real-time or near real-time. In this manner, editorial does not have to wait for another iteration through the production team before viewing the updated scene. Further, editorial is able to make choices about which individual elements, and versions of elements, are composed in a scene, without asking the production team to re-create specific combinations.

With the real-time content creation pipeline disclosed herein, the feedback loop from the production assets generated by the production team to editorial and back to the production team is more efficient and faster relative to prior approaches. Further, editorial has access to an increased number of inputs, production assets, and degrees of freedom relative to prior approaches. A user is no longer limited to working only with rendered 2D frames and sets of frames that have been generated from the production team and other upstream processes. Instead, editorial may access each production asset and scene object individually, and may assemble any technically feasible combination of the production assets and scene objects during the editorial process. In this manner, editorial is provided with greater control over which changes are admitted into and excluded from the editorial cut. Further, editorial can flag individual production assets and scene objects as problematic and/or in need of revision by the production team.

In some embodiments, the editorial workstation may store a file with additional data that includes details regarding the assembled version of the editorial cut in the editorial workstation, including modifications to the editorial cut made by one or more users of the editorial workstation. The editorial workstation and/or production asset management system may store the file with such additional data in any technically feasible data store, such as the production database. Subsequently, the additional data may be loaded along with the other information related to the editorial cut in order to reproduce the editorial cut, including modifications, at any artist workstation or editorial workstation. In such embodiments, whenever an editorial project is saved, an asset list may be generated by the managing application and written to a file that is stored in the production database.

Because 3D production assets, scene objects, and other content in the real-time environment does not need to be collapsed into a 2D frame in order to be ingested by editorial, all previous versions of published content may be individually swapped on-demand for rapid iteration. Further, editorial has access to a greater breadth of content types, and can mix and match versions among those content types (e.g. mixing version 5 of a published light source with version 4 of a published character) to conform the best content items that are available. In this manner, the disclosed editorial system exposes these capabilities and provides greater control to the user than was previously possible via prior approaches.

The techniques disclosed herein are applicable to any media production that includes animated content, including media productions that include animated content in junction with live action content. The disclosed techniques are applicable to any studio or production company that generates animated content. Depending on the visual resolution and compute performance of the editorial workstation, the disclosed techniques may be employed for web content production, video game production, extended reality (XR) production (including augmented reality (AR) production and/or virtual reality (VR) production), television production, and feature film production. In some embodiments, the disclosed techniques may be employed to generate linear animated content and then to generate derivative interactive and immersive experiences using the same production assets, scene objects, and other content.

The disclosed techniques may be employed at any or all stages of the content creation pipeline associated with animated media production, including the production asset development stage and any downstream production stages. The disclosed techniques may be employed for any technically feasible combination of production assets, scene objects, and other content, including, without limitation, lighting sources, visual effects (VFX), object rendering, scene layout, virtual cameras, audio, and character design, animation, and performance.

System Overview

FIG. 1 illustrates a system 100 configured to implement one or more aspects of the present invention. As shown, the system includes, without limitation, an artist workstation 102, a production database 104, a production asset management system 106, and an editorial workstation 108, in communication with each other via a communications network 120. Communications network 120 may be any suitable environment to enable communications among remote or local computer systems and computing devices, including, without limitation, wireless and wired LANs (Local Area Networks) and internet-based WANs (Wide Area Networks).

Artist workstation 102 includes, without limitation, a computing device that may be a standalone server, a cluster or "farm" of servers, one or more network appliances, or any other device suitable for implementing one or more aspects of the present invention. Illustratively, artist workstation 102 communicates over communications network 120 via communications link 112.

As further described herein, an artist or other production team member, operating artist workstation 102, generates or modifies a 3D production asset. Artist workstation 102 publishes the 3D production asset by transmitting 3D data associated with the 3D production asset along with associated metadata to production database 104. The 3D data may include any technically feasible data associated with the 3D production asset, including, without limitation, one or more 3D models, light sources, textures, and virtual cameras.

Production database 104 includes, without limitation, a storage device that may be a standalone networked attached storage (NAS) system, a storage area-network (SAN), a cluster or "farm" of storage devices, a distributed storage architecture, or any other device suitable for implementing one or more aspects of the present invention. Additionally or alternatively, production database 104 may include, without limitation, a computing device with a storage subsystem that may be a standalone server, a cluster or "farm" of servers, one or more network appliances, or any other device suitable for implementing one or more aspects of the present invention. Illustratively, production database 104 communicates over communications network 120 via communications link 114.

Production database 104 receives 3D production assets from artist workstation 102 in the form of 3D data and associated metadata, along with any other information to perform one of more of the techniques disclosed herein. Production database 104 stores the 3D production assets on one or more data stores. Production database 104 maintains a list of the available 3D production assets, including 3D data and metadata associated with the 3D production assets. Production database 104 receives requests for access to particular 3D production assets from production asset management system 106. In response, production database 104 retrieves all information about the requested 3D production assets. Production database 104 then transmits all information about the 3D production assets to production asset management system 106.

In some embodiments, production database 104 may be managed by a production database management system.

One such production database management system is Shotgun digital asset management software. In general, production database 104 manages the 3D production assets as "entities," where entities are atomic, configurable data items that may be flexibly configured and concatenated in various ways. The entity approach employed by production database 104 permits variants and properties of the various 3D production assets to be flexibly organized, stored, and accessed in any desired manner based on the needs of the production. Additionally or alternatively, production database 104 may employ any technically feasible approach for organizing the database of 3D production assets.

As a result, the manner in which production database 104 is structured is likewise flexible and may be customized for a particular production. At the time that a new or updated 3D production asset is published by artist workstation 102, production database 104 includes a reference to the file location of the published 3D production asset along with associated metadata. As further described herein, the metadata includes, without limitation, artist name, a thumbnail image of the asset, a task associated with the asset, version number of the asset, the asset source path or location, and the software application that generated the asset. The thumbnail image may be any technically feasible representation of the 3D production asset, including, without limitation, a still 2D image, an animated graphic interchange format (GIF) image or clip, and a miniature 3D model rotating on a turntable. The task may include any movement or action that is performed by the 3D production asset. For example, a task associated with a character may include "move the right arm 90 degrees in a clockwise direction." Additionally or alternatively, the metadata may include a complete version and variant history of the associated 3D production assets. As such, metadata may include rich contextual information about a 3D production asset over time. This information may be organized in any number of ways in the production database in a manner that is useful to a production. In general, the 3D production asset is published and stored as a "container" that includes a payload with the 3D data and the metadata associated with the 3D production asset.

The metadata may further include any number of user specified tags. In one example, a digital artist working at artist workstation 102 could be generating or modifying a 3D animatable character called "Susie." Susie could have a number of different properties that are accessed and employed in various contexts, such as Susie running, Susie jumping, and Susie walking. The different properties could be specific to a particular shot, such as "Susie animation for take 4 of scene 45." Further variants could include Susie's properties regarding character modeling, texture maps, various clothing outfits, and so on. The different variants and properties for the Susie character could be tagged with appropriate tag names. Production database 104 stores the tags for the corresponding 3D production asset in a manner that is searchable in various ways and in various contexts by the production asset management system 106. Production database 104 could store all of the 3D production assets for Susie, including all of the variants and properties for Susie, which could be represented as a content library in a hierarchical manner by the production asset management system 106, with the asset name "Susie" at a top level. Production asset management system 106 could organize the next level down across any relevant variant or property, including, without limitation, activity type, clothing, texture, and scene number. Similarly, production asset management system 106 could organize each additional level across any other variant or property. Production asset management system 106 could display the particular variant or property of a 3D production asset for each level in the hierarchy to best suit the needs of a particular production or the user of the editorial workstation 108. In this manner, editorial workstation 108 could access different variants and properties of Susie via the hierarchy and tag names associated with the 3D production assets related to Susie.

Production asset management system 106 includes, without limitation, a computing device that may be a standalone server, a cluster or "farm" of servers, one or more network appliances, or any other device suitable for implementing one or more aspects of the present invention. Additionally or alternatively, production asset management system 106 includes, without limitation, a computing device that may be a personal computer, video game console, personal digital assistant, mobile phone, mobile device, or any other device suitable for implementing one or more aspects of the present invention. Illustratively, production asset management system 106 communicates over communications network 120 via communications link 116. Communications link 116 may be any technically feasible communication channel, including, without limitation, point-to-point communications channels, one or more LANs, and one or more internet-based WANs.

In operation, production asset management system 106 communicates with production database 104. Production asset management system 106 is responsible for displaying relevant parts of production database 104 to the user on the editorial workstation 108. Production asset management system 106 retrieves metadata associated with 3D production assets stored on production database 104. Further, production asset management system 106 receives updated information regarding the 3D production assets that are currently displayed on the editorial workstation 108. Production asset management system 106 updates a content library based on the metadata for the 3D production assets that are currently displayed on the editorial workstation 108. Production asset management system 106 then transmits the content library to the editorial workstation 108 for display.

Editorial workstation 108 includes, without limitation, a computing device that may be a standalone server, a cluster or "farm" of servers, one or more network appliances, or any other device suitable for implementing one or more aspects of the present invention. Additionally or alternatively, editorial workstation 108 includes, without limitation, a computing device that may be a personal computer, video game console, personal digital assistant, mobile phone, mobile device, or any other device suitable for implementing one or more aspects of the present invention. Illustratively, editorial workstation 108 communicates over communications network 120 via communications link 118. Communications link 118 may be any technically feasible communication channel, including, without limitation, point-to-point communications channels, one or more LANs, and one or more internet-based WANs.

In operation, editorial workstation 108 displays a scene that includes various 3D production assets. Editorial workstation 108 plays the scene via a timeline-based interface. Editorial workstation 108 may scrub back and forth on the timeline and may stop at any frame in the scene. Editorial workstation 108 continually transmits a stream of data that identifies the 3D production assets included in the frame currently being displayed as an asset list. Editorial workstation 108 transmits this asset list to production asset management system 106 as a data stream. In response, the production asset management system 106 transmits the asset list to the production database 104. The production database returns a list of the available versions and variants for each of the 3D production assets in the asset list as a content library This content library may also contain other contextual information about the versions and variants, which is stored in the production database 104 as metadata for the 3D production assets.

Editorial workstation 108 executes an editorial application that displays the 3D production assets as visual media on a display. If editorial workstation 108 receives a user-input selection of a 3D production asset, then editorial workstation 108 transmits the selection of the 3D production asset to production asset management system 106 as an asset list via a data stream. Production asset management system 106 then transmits a request for the selected version of the 3D production asset to production database 104. Upon receiving information about the version history, variants, and other related metadata for the 3D production asset from production database 104, production asset management system 106 transmits this information to editorial workstation 108. This information is displayed to the user of the editorial workstation as a content library through a user interface. The user of editorial workstation 108 is then able to modify the 3D production asset in the current edit of the editorial application by swapping the 3D production asset with any version or variant of the 3D production asset found in the production database. Similarly, the user may choose to replace the selected 3D production asset with an entirely different 3D production asset. This option is made available to the user through a search function in the production management system 106, which queries the production database 104 for assets based on keywords and appends those assets to the content library.

It will be appreciated that the system shown herein is illustrative and that variations and modifications are possible. In one example, although the system 100 of FIG. 1 is illustrated with one artist workstation 102, one production database 104, one production asset management system 106, and one editorial workstation 108, the system 100 could include any technically feasible number of artist workstations 102, production databases 104, production asset management systems 106, and editorial workstations 108 within the scope of the present disclosure. In another example, the 3D production assets could be stored on any technically feasible computing device or storage device that is in communication with communications network 120, including one or more servers in a cloud environment instead of or in addition to production database 104. In another example, the user of editorial workstation 108 could replace one 3D production asset with an entirely different 3D production asset present in production database 104 (such as replacing a tree asset with a flower asset). Any one or more of the 3D production assets could be streamed between artist workstation 102, production database 104, production asset management system 106, editorial workstations 108, and any one or more of the servers in the cloud environment. In this manner, the techniques described herein are not limited to the processing and storage resources of system 100.

Leveraging Content Libraries in Animated Production

Figure 2:
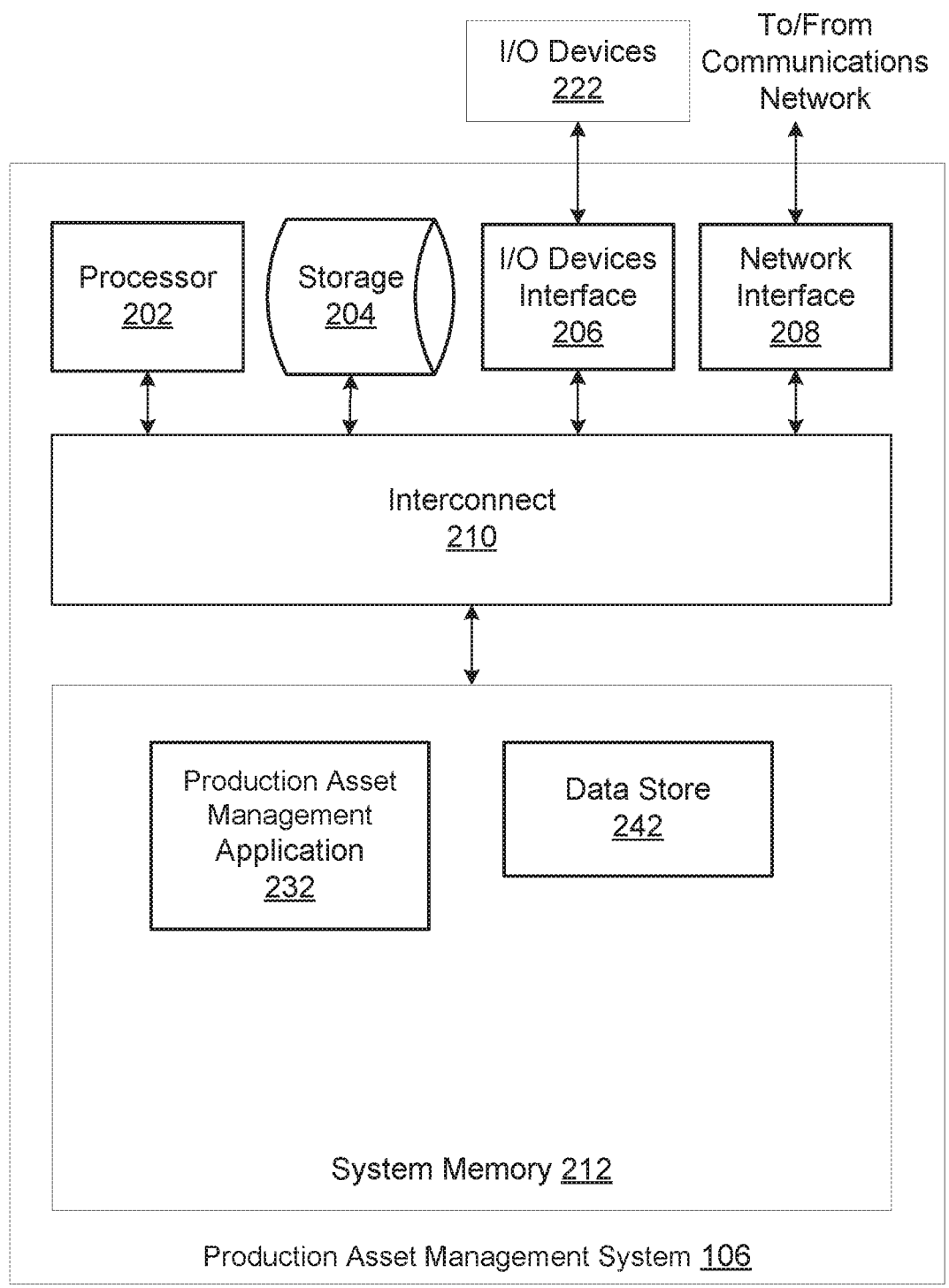
FIG. 2 is a more detailed illustration of the production asset management system of FIG. 1, according to various embodiments of the present invention.

FIG. 2 is a more detailed illustration of the production asset management system 106 of FIG. 1, according to various embodiments of the present invention. As shown, production asset management system 106 includes, without limitation, a processor 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, input/output (I/O) devices interface 206, storage 204, network interface 208, and system memory 212. The I/O devices interface 206 is configured to receive input data from user I/O devices 222. Examples of user I/O devices 222 may include one of more buttons, a keyboard, and a mouse or other pointing device. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals. The display device may be included in a VR/AR headset. Further, the display device may project an image onto one or more surfaces, such as walls or projection screens.

Processor 202 is included to be representative of a single central processing unit (CPU), multiple CPUs, a single CPU having multiple processing cores, and the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a production asset management application 232 and a data store 242. The production asset management application 232, when executed by the processor 202, performs one or more operations associated with the production asset management system 106, as further described herein. Production asset management application 232 stores data in and retrieves data from data store 242, such as 3D production assets, related metadata, and asset lists, as further described herein. Additionally or alternatively, production asset management application 232 stores data in and retrieves data from any technically feasible storage device, including, without limitation, storage 204. As needed, production asset management application 232 retrieves data stored in storage 204 and stores the retrieved data in data store 242. Likewise, as needed, production asset management application 232 retrieves data stored in data store 242 and stores the retrieved data in storage 204.

In operation, production asset management application 232 communicates with production database 104 to retrieve 3D production assets corresponding to frames included in particular editorial cuts, or corresponding too arbitrary input by the user, such as through a keyword search function. Production database 104 retrieves the metadata associated with the 3D production assets in order to list the relevant details of the 3D production assets in the asset list. Further, production database 104 analyzes the metadata to determine a location or other identifier associated with the production assets in order to retrieve the 3D production assets. Upon receiving a request from editorial workstation 108, production asset management application 232 updates the asset list for a current frame displayed on editorial workstation 108. Production asset management application 232 then transmits the asset list to production database 104 and requests all metadata related to the assets in the asset list. The response from production database 104 is organized by the production management application 232 into a content library. Editorial workstation 108 then displays the content library via a user interface on a display monitor. Further, editorial workstation 108 accesses 3D production assets, including 3D data and related metadata, from production database 104.

Production asset management application 232 communicates with the production database 104 via an applications programming interface (API) that is written in a programming language such as Python. Production asset management application 232 retrieves metadata and information about various 3D production assets via this API. When editorial workstation 108 generates an asset list of 3D production assets, production asset management application 232 requests information from production database 104 and organizes the information into a content library that contains all available versions, variants, and other metadata for that 3D production asset. Production asset management application 232 displays this content library as text and images on editorial workstation 108 via a user interface.

In various embodiments, production asset management application 232 may execute on a separate workstation or server, such as production asset management system 106, that is accessible to the editorial workstation 108. Additionally or alternatively, production asset management application 232 may execute on the editorial workstation 108. In either case, production asset management application 232 communicates and interacts with a streaming service and/or an editor application executing on editorial workstation 108.

Figure 3:
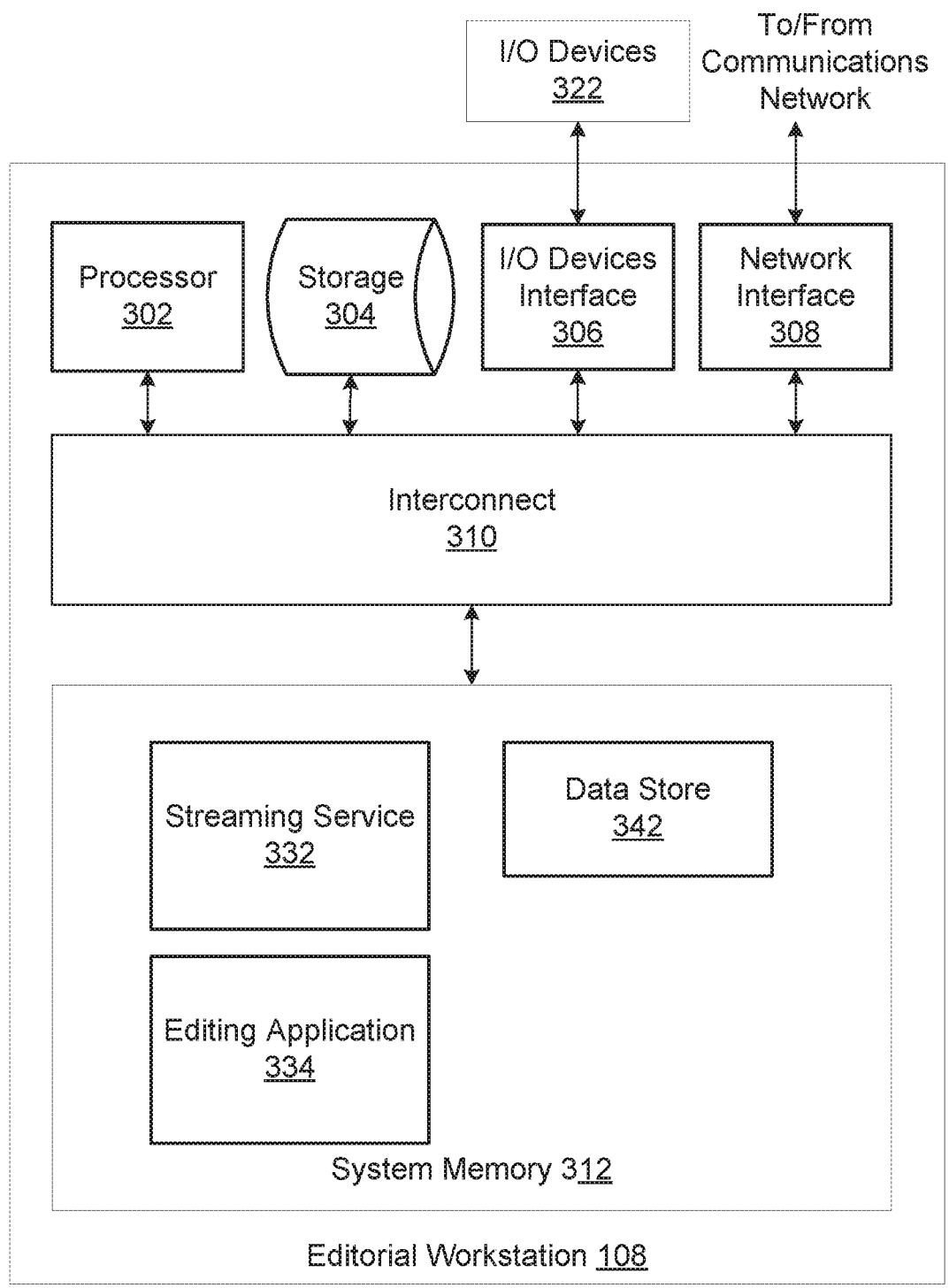
FIG. 3 is a more detailed illustration of the editorial workstation of FIG. 1, according to various embodiments of the present invention.

FIG. 3 is a more detailed illustration of the editorial workstation 108 of FIG. 1, according to various embodiments of the present invention. As shown, editorial workstation 108 includes, without limitation, a central processing unit (CPU) 302, storage 304, an input/output (I/O) devices interface 306, a network interface 308, an interconnect 310, and a system memory 312. Processor 302, storage 304, input/output (I/O) devices interface 306, network interface 308, interconnect 310, and system memory 312 operate substantially the same as the corresponding elements described in conjunction with FIG. 2, except as further described below.

The processor 302 retrieves and executes programming instructions stored in the system memory 312. Similarly, the processor 302 stores and retrieves application data residing in the system memory 312. The interconnect 310 facilitates transmission, such as of programming instructions and application data, between the processor 302, input/output (I/O) devices interface 306, storage 304, network interface 308, and system memory 312. The I/O devices interface 306 is configured to receive input data from user I/O devices 322. Examples of user I/O devices 322 may include one of more buttons, a keyboard, and a mouse or other pointing device. The I/O devices interface 306 may also include an audio output unit configured to generate an electrical audio output signal, and user I/O devices 322 may further include a speaker configured to generate an acoustic output in response to the electrical audio output signal. Another example of a user I/O device 322 is a display device that generally represents any technically feasible means for generating an image for display. For example, the display device could be a liquid crystal display (LCD) display, CRT display, or DLP display. The display device may be a TV that includes a broadcast or cable tuner for receiving digital or analog television signals.

Processor 302 is included to be representative of a single CPU, multiple CPUs, a single CPU having multiple processing cores, and the like. And the system memory 312 is generally included to be representative of a random access memory. The storage 304 may be a disk drive storage device. Although shown as a single unit, the storage 304 may be a combination of fixed and/or removable storage devices, such as fixed disc drives, floppy disc drives, tape drives, removable memory cards, or optical storage, network attached storage (NAS), or a storage area-network (SAN). Processor 302 communicates to other computing devices and systems via network interface 308, where network interface 308 is configured to transmit and receive data via a communications network.

The system memory 312 includes, without limitation, a streaming service 332, an editing application 334, and a data store 342. The streaming service 332 and editing application 334, when executed by the processor 302, perform one or more operations associated with editorial workstation device 108 of FIG. 1, as further described herein. Streaming service 332 and editing application 334 store data in and retrieve data from data store 342, such as 3D production assets, related metadata, and asset lists, as further described herein. Additionally or alternatively, streaming service 332 and editing application 334 store data in and retrieves data from any technically feasible storage device, including, without limitation, storage 304. As needed, streaming service 332 and editing application 334 retrieve data stored in storage 304 and store the retrieved data in data store 342. Likewise, as needed, streaming service 332 and editing application 334 retrieve data stored in data store 342 and stores the retrieved data in storage 304.

In operation, streaming service 332 communicates with production asset management application 232 to exchange 3D production assets, including 3D data and related metadata. Streaming service generates an asset list based on the current frame of the editing application 334. Further, streaming service 332 receives asset lists from editing application 334 and transmits requests for 3D production assets to production asset management application 232.

A user operating editing application 334 plays through an editorial and/or scrubs back and forth on a timeline related to the editorial cut to navigate to a particular frame of the editorial cut. As the editorial cut plays or scrubs, characters and objects may move within the editorial cut and the virtual camera may move to view the editorial from different positions and angles. The user then stops on a particular frame within the editorial cut. When displaying a particular frame included in the editorial cut, editing application 334 requests a list of the 3D production assets included in the frame. In response, streaming service 332 collects and catalogs the 3D production assets that are visible to the user in the current frame. Streaming service 332 transmits the 3D production assets as an asset list to production asset management application 232. In some embodiments, the asset list may be filtered by a user selection of certain 3D production assets within the frame, or a list of all 3D production assets in the scene including 3D production assets that are not visible in the camera frame. In this manner, the asset list is not limited to the 3D production assets that are currently visible in the camera frame.

Production asset management application 232 transmits a request to production database 104, requesting a list of all the relevant versions, variants, and other metadata for each of the 3D production assets included in the asset list. Production asset management application 232 retrieves metadata related to the relevant versions and variants from the production database 104, organizes the metadata into a content library, and displays the content library on the editorial workstation 108. The content library includes the versions and variants in a scrollable list format along with thumbnails that depict each of the versions and variants and any related asset properties that exist as metadata in the production database, such as artist name, publish date and time, etc. As the user scrubs back and forth on the timeline, streaming service 332 continually transmits the list of 3D production assets in the current frame to production asset management application 232. Production asset management application 232 continually retrieves metadata for the list of 3D production assets from production database 104. Production asset management application 232 continually updates content libraries for the user to visually inspect on the display monitor. In this manner, the content library is continually updated to reflect the assets that are available.

When viewing a content library in the production asset management application 232, the user may select a particular asset. Asset management application 232 then transmits the relevant versions, variants, and other metadata of the selected asset (based on the tag names further described herein) to editorial workstation 108. Similarly, editing application 334 may receive, from the user, a selection of a particular version or variant of the 3D production asset in the editing application 334. Streaming service 332 then transmits the selection to production asset management application 232 as an asset list. Production asset management application 232 retrieves the requested version or variant of the 3D production asset from production database 104 and transmits all available information, via metadata, about the requested version or variant, such as artist name, publish date and time, etc. Production database 104 also transmits information about other versions or variants of the 3D production asset that have been previously published by artist workstation 102 to asset management application 232. Asset management application 232 transmits this information to editorial workstation 108 for display to the user via a user interface. The user is then able to inspect and select this information in asset management application 232. Based on the user selection in asset management application 232, this information may be transmitted to editing application 334 for display purposes. Similarly, a new version or variant of the 3D production asset may replace the original 3D production asset in editing application 334.

In one example, editing application 334 could be playing or scrubbing an editorial cut that includes various 3D production assets. Editing application 334 could stop on a frame in the editorial cut that includes a street, a lamppost, and a character. A user could select the street, lamppost, character, and any other 3D production assets included in the frame. Streaming service 332 could transmit a request to production asset management application 232 for versions, variants, and other metadata related to the street, lamppost, character, and any other relevant 3D production assets included in the frame. Production asset management application 232 could transmit the request to production database 104 for this asset list and retrieve the metadata from production database 104. Production asset management application 232 could then retrieve all information about the version history, available variants, and other metadata for the asset list in the form of an organized content library. Production asset management application 232 could transmit this content library to editorial workstation 108 for display via a user interface on the display monitor. Production asset management application 232 could display the content library via any technically feasible format including, without limitation, a popup window, a drop-down menu, or within a window incorporated in the user interface of editing application 334. The content library includes links to all the versions and variants of the street, lamppost, and character that are available.

Editing application 334 could then receive a selection of a different version or variant of the street lamp. Streaming service 332 could transmit a request for the version or variant of the street lamp to production asset management application 232. Production asset management application 232 could retrieve the requested version or variant of the street lamp from production database 104 and transmit the version or variant to streaming service 332. Streaming service could transmit the version or variant to editing application 334. Editing application could then replace the previously displayed version or variant of the street lamp with the received version or variant of the street lamp. All other 3D production assets included in the frame would remain unchanged. The user could continue to select and replace different versions of the street, the lamppost, character, and each of the other scene elements. In this manner, the user could separately access and combine different versions of the 3D production assets included in the frame without communicating with or involving other members of the production team. As a result, the editorial process is integral to and interactive with other parts of the production process rather than an isolated process at the end of the content creation pipeline.

In some embodiments, the user may search for additional 3D production assets that are not included in the current editorial cut in order to add 3D production assets to the editorial cut. For example, editing application 334 could be stopped on a frame that includes a street, a lamppost, and a character. The user wants to add a stoplight to the editorial cut, even though the editorial cut currently does not include a stoplight. The user could enter a number of search parameters via a user interface to search for potential stoplights that could be added into the editorial cut. The user could limit the search to stoplights that have been generated and published for the current production. Additionally or alternatively, the user could search for stoplights published for other current productions and/or prior productions. The user could further add parameters to look for stoplights of a particular type, stoplights from a particular production, and so on.

Streaming service 332 transmits the search request to production asset management application 232. Production asset management application 232 queries production database 104 for 3D production assets that meet the parameters of the search query and retrieve metadata associated with those 3D production assets. Production asset management application 232 then organizes the metadata as a content library and displays the content library on the editorial workstation 108 in conjunction with editing application 334. Upon receiving a selection of one of the 3D production assets, streaming service 332 transmits a request for the selected 3D production asset to production asset management application 232. Production asset management application 232 retrieves the selected 3D production asset from production database 104 and transmits the 3D production asset to editing application 334. Editing application 334 then inserts the 3D production asset into the editorial cut. Production asset management application 232 then publishes the placement of the new 3D production asset in the editorial cut by transmitting the placement information to production asset management application 232. Production asset management application 232 then updates production database 104 to indicate that the newly placed 3D production asset is now included in the production. In this manner, the user may add 3D production assets to a scene in editorial in addition to swapping existing 3D production assets with other versions and variants. In this manner, production asset management application 232 and editorial application 334 track editorial changes that may be subsequently retrieved via artist workstation 102 and/or editorial workstation 108 as a reference for other users working on the production.

FIG. 4 illustrates an exemplary metadata set 400 for a production asset that is related to an editorial cut, according to various embodiments of the present invention. As further described herein, 3D production assets stored in production database 104 are associated with various metadata items. The metadata set 400 illustrates the metadata for one such 3D production asset stored in production database 104. As shown, the metadata set 400 includes a thumbnail image 410, tag identifiers, 420, tag names 430, and tag values 440.

The thumbnail image 410 may be any technically feasible representation of the 3D production asset, including, without limitation, a still 2D image, an animated GIF image or clip, and a miniature 3D model rotating on a turntable. If the thumbnail image is sequence of images, such as an animation or motion clip, then the thumbnail image includes a play button 412 that, when activated, causes the images of the animation or motion clip to play in sequence.

For each tag, the tag identifier 420 uniquely identifies the tag, the tag name 430 specifies the title of the tag, and the tag value 440 specifies the current setting of the tag. In that regard, the tag with a tag identifier 420 of "1" has a tag name 430 of "Artist" and a tag value 440 of "JoeSmith," thereby indicating the artist who generated and published the 3D production asset. The tag with a tag identifier 420 of "6" has a tag name 430 of "Created by" and a tag value 440 of "object_creator 1.0," thereby indicating the software application employed to generate the 3D production asset. The tag with a tag identifier 420 of "27" has a tag name 430 of "Path to Geometry" and a tag value 440 of "[J:\\999U-Assets\\102\\chars\\999U-101_chars_bubbleman Dancing \\scenes\\version_history\\999U-102_chars_bubblemanDancing_model_209.ma]," thereby indicating the location in production database 104 where the 3D production asset may be accessed and/or retrieved. The tag with a tag identifier 420 of "34" has a tag name 430 of "Task" and a tag value 440 of "No Value," thereby indicating that the task for the 3D production asset has not yet been assigned. The tag with a tag identifier 420 of "39" has a tag name 430 of "Version Name" and a tag value 440 of "999U-102_chars_bubblemanDancing209," thereby indicating the particular version or variant of the 3D production asset represented by the metadata set 400. Other tags in the metadata set 400 have tag identifiers, 420, tag names 430, and tag values 440 as shown.

Although the metadata set 400 is depicted as having a thumbnail image 410 and a set of tags, each tag having a tag identifier 420, tag name 430, and tag value 440, the metadata set 400 could be included in a file that is stored in any technically feasible format, including, without limitation, JavaScript Object Notation (JSON), eXtensible Markup Language (XML), and comma separated value (csv) formats. Further, although the metadata set 400 is depicted with a specific set of tags, the metadata set 400 could include any technically feasible subset of the tags shown in FIG. 4, within the scope of the present invention. Additionally or alternatively, the metadata set 400 could include any other technically feasible tags not shown in FIG. 4 within the scope of the present invention, including, but including, but not limited to, the metadata items shown in FIGS. 5 and 6.

FIG. 5 illustrates another exemplary metadata set 500 for a production asset that is related to an editorial cut, according to various other embodiments of the present invention. As further described herein, metadata is exchanged between production database 104 and production asset management system 106. Similarly, metadata is exchanged between editing application 334, streaming service 332, production asset management application 232 and production database 104. The metadata set 500 illustrates such metadata for one 3D production asset. As shown, the metadata set 500 includes lines of a script in JSON format.

Each script line identifies a name and a value for a particular metadata item or includes a delimiter that begins or ends a block of multiple script lines. In that regard, script line 21 includes the character string "user": "JoeSmith," thereby indicating the user who generated and published the 3D production asset. Script lines 32-34 include the character string "task": ["LOD25 Asset"], thereby indicating the task associated with the 3D production asset. Script lines 35-37 include the character string "source_path": ["J:\\999U-Assets\\102\\chars\\999U-101_chars_bubbleman Dancing \\scenes\\version_history\\999U-102_chars_bubblemanDancing_model_209.ma"], thereby indicating the location in production database 104 where the 3D production asset may be accessed and/or retrieved. Script line 39 includes the character string "version": "209," thereby indicating the particular version or variant of the 3D production asset represented by the metadata set 500. Other metadata items in the metadata set 500 correspond to JSON script lines as shown. In addition, the JSON-formatted script illustrated in FIG. 5 includes nested relationships between tags. As one example, "sg_entity," as shown on script line 9, is a child of parent "AssetInfo," as shown on script line 8, because "AssetInfo" includes script lines 8-18. By contrast, "sg_entity," as shown on script line 9, is a not child of "Header," as shown on script line 2, because "Header" includes script lines 2-7.

Although the metadata set 500 is depicted as having certain metadata items expressed as lines in a JSON-formatted script, the metadata set 500 could be included in a file that is stored in any technically feasible format, including, without limitation, a list of tags, XML, and csv formats. Further, although the metadata set 500 is depicted with a specific set of metadata items, the metadata set 400 could include any technically feasible subset of the metadata items shown in FIG. 5, within the scope of the present invention. Additionally or alternatively, the metadata set 500 could include any other technically feasible tags not shown in FIG. 5 within the scope of the present invention, including, but including, but not limited to, the metadata items shown in FIGS. 4 and 6.

Figure 6:
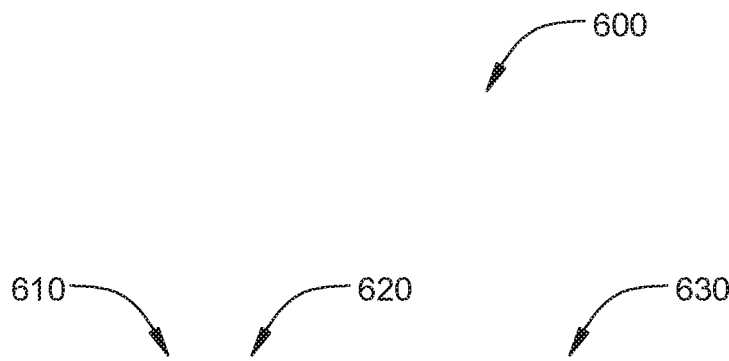
FIG. 6 illustrates yet another exemplary metadata set for a production asset that is related to an editorial cut, according to various other embodiments of the present invention.

FIG. 6 illustrates yet another exemplary metadata set 600 for a production asset that is related to an editorial cut, according to various other embodiments of the present invention. As further described herein, 3D production assets stored in editorial workstation 108 are associated with various metadata items. The metadata set 600 illustrates the metadata for one such 3D production asset stored on editorial workstation 108. As shown, the metadata set 600 includes, tag identifiers, 610 tag names 620, and tag values 630.

For each tag, the tag identifier 610 uniquely identifies the tag, the tag name 620 specifies the title of the tag, and the tag value 630 specifies the current setting of the tag. In that regard, the tag with a tag identifier 610 of "11" has a tag name 620 of "User" and a tag value 630 of "JoeSmith," thereby indicating the user who generated and published the 3D production asset. The tag with a tag identifier 610 of "12" has a tag name 620 of "Version" and a tag value 630 of "209," thereby indicating the particular version or variant of the 3D production asset represented by the metadata set 600. The tag with a tag identifier 610 of "17" has a tag name 620 of "Task" and a tag value 630 of "LOD25 Asset," thereby indicating the task associated with the 3D production asset. The tag with a tag identifier 610 of "18" has a tag name 620 of "Source_path" and a tag value 630 of "[JA\999U-Assets\\102\\chars\\999U-101_chars_bubblemanDancing\\scenes\\version_history\\999U-102_chars_bubblemanDancing_model_209.ma]," thereby indicating the location in production database 104 where the 3D production asset may be accessed and/or retrieved. Other tags in the metadata set 600 have tag identifiers, 610, tag names 620, and tag values 630 as shown.

Although the metadata set 600 is depicted as having a set of tags, each tag having a tag identifier 610, tag name 620, and tag value 630, the metadata set 600 could be included in a file that is stored in any technically feasible format, including, without limitation, JSON, XML, and csv formats. Further, although the metadata set 600 is depicted with a specific set of tags, the metadata set 600 could include any technically feasible subset of the tags shown in FIG. 6, within the scope of the present invention. Additionally or alternatively, the metadata set 600 could include any other technically feasible tags not shown in FIG. 6 within the scope of the present invention, including, but including, but not limited to, the metadata items shown in FIGS. 4 and 5.

Figure 7A:
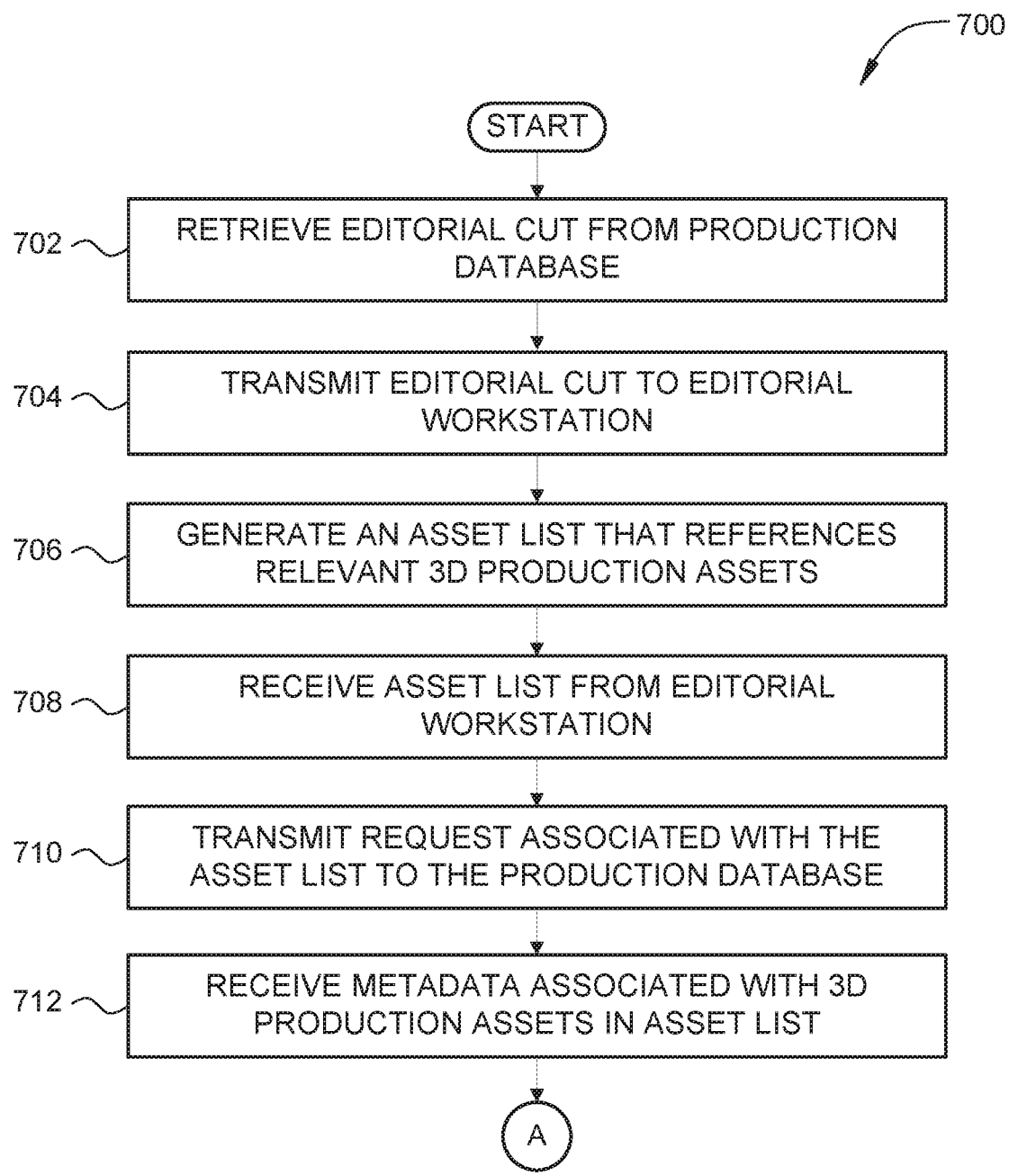
FIGS. 7A-7B set forth a flow diagram of method steps for automatically exposing 3D production assets to an editorial workstation in a content creation pipeline, according to various embodiments of the present invention.
Figure 7B:
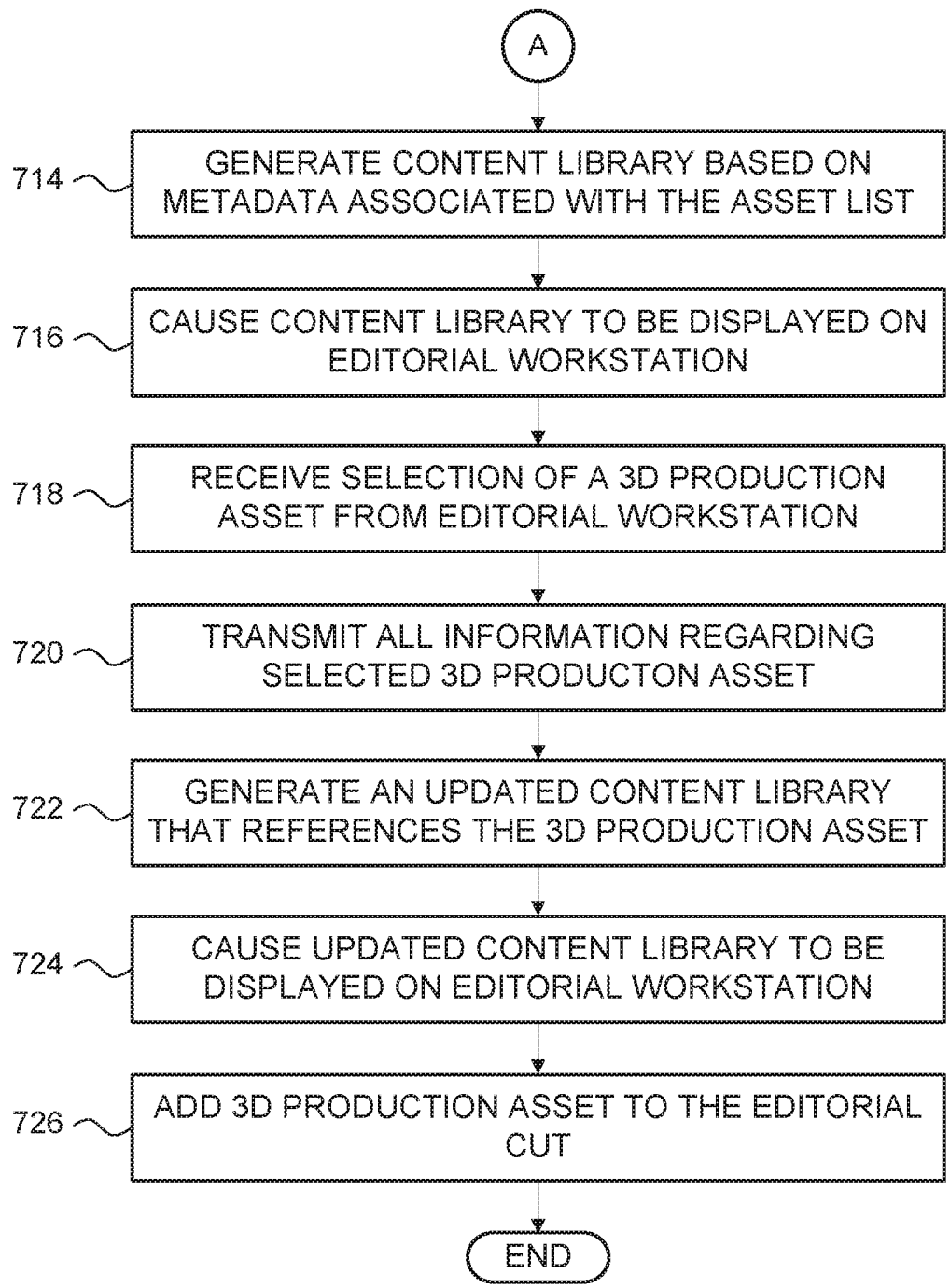

FIGS. 7A-7B set forth a flow diagram of method steps for automatically exposing 3D production assets to an editorial workstation in a content creation pipeline, according to various embodiments of the present invention. Although the method steps are described in conjunction with the systems of FIGS. 1-6, persons of ordinary skill in the art will understand that any system configured to perform the method steps, in any order, is within the scope of the present invention.

As shown, a method 700 begins at step 702, where a production asset management application 232 executing on a production asset management system 106 retrieves an editorial cut from a production database 104. The editorial cut includes a sequence of individual frames that represents a scene in a media production. The editorial cut further includes the 3D production assets included in the scene, along with the relevant metadata associated with those 3D production assets. At step 704, production asset management application 232 transmits the editorial cut, including the sequence of individual frames, the 3D production assets included in the scene, and the relevant metadata to an editorial workstation 108.

At step 706, an editing application 334 executing on an editorial workstation 108 generates an asset list that references relevant 3D production assets associated with the editorial cut. The asset list may include a set of 3D production assets related to a particular frame included in the editorial cut, such as the frame of the editorial cut that is currently being displayed on a display of the editorial workstation 108. Additionally or alternatively, the asset list may include a 3D production asset that is not related to any of the 3D production assets currently included in the editorial cut. Such a 3D production asset may be a 3D production asset or group of 3D production assets within the editorial application that has been selected by a user of the editorial workstation 108. The editing application 334 passes a link to the asset list to a streaming service 332 executing on the editorial workstation 108. The streaming service 332, in turn, streams and/or transmits the asset list to the production asset management application 232.

At step 708, the production asset management application 232 receives the asset list from the streaming service 332 executing on the editorial workstation 108. At step 710, the production asset management application 232 transmits a request associated with the asset list to production database 104 to request any and all available information about each 3D production asset included in and/or associated with the asset list received from the streaming service 332. This information is organized in production database 104 according to metadata that is generated at the time that each 3D production asset, and/or variant or version thereof, is published by artist workstation 102.

At step 712, production asset management application 232 receives metadata regarding the 3D production assets included in the asset list from production database 104. At step 714, production asset management application 232 generates a content library based on the asset list received from production database 104. At step 716, production asset management application 232 causes the content library to be displayed on a display of the editorial workstation 108. The user of the editorial workstation 108 may then inspect and/or select different 3D production assets associated with the content library. For example, the user may select an alternate version or variant of a 3D production asset associated with a frame of the editorial cut. Additionally or alternatively, the user may select a 3D production asset that is not currently included in the editorial cut.

At step 718, production asset management application 232 receives a selection of a 3D production asset from editorial workstation 108. The selection may be related to a version or variant of a 3D production asset that is different from the version or variant of the 3D production asset included in a frame that is currently displayed on the editorial workstation 108. For example, the user may select a version or variant of a 3D production asset included in the content library to replace the version or variant of the 3D production asset that currently appears in the editorial cut, and is currently displayed via the editing application 334. Additionally or alternatively, the user may select a 3D production asset that is not related to any of the 3D production assets that are currently displayed on the editorial workstation 108. For example, a user may enter search parameters via the production asset management application 232 to find and retrieve a new 3D production asset in the production database 104 that is not currently included in the editorial cut displayed on the editorial workstation 108. In this manner, any 3D production asset included in the asset list generated by the editing application 334 may be replaced and/or augmented with an entirely new 3D production asset, and/or variant or version thereof, stored in production database 104.

At step 720, production asset management application 232 transmits all available information about the selected 3D production asset to editorial workstation 108, based on the related metadata. At step 722, production asset management application 232 generates an updated content library that references the newly added 3D production asset to editorial workstation 108. The updated content library includes information regarding the new version or variant that replaced a 3D production asset currently included in the editorial cut. Additionally or alternatively, the updated content library includes information regarding the new 3D production asset that has been added to the editorial cut.

At step 724, production asset management application 232 causes the updated content library to be displayed on a display of the editorial workstation 108 via the streaming service 332 executing on the editorial workstation 108. At step 726, editorial workstation 108 adds the 3D production asset to the current frame of the editorial cut. If the 3D production asset is a different version or variant of a 3D production asset currently displayed in the frame, then editorial workstation 108 replaces the currently displayed 3D production asset with the different version or variant of the 3D production asset. If the 3D production asset is a new 3D production asset that is not currently displayed in the frame, then editorial workstation 108 adds the new 3D production asset to the frame. The method 700 then terminates.

In sum, the disclosed approach provides techniques for automatically exposing 3D production assets in their native form for use in the editorial process. Artists and/or other production team members, operating one or more artist workstations, generate or modify 3D production assets that are related to a media production. The artist workstations publish the 3D production assets by transmitting the 3D production assets them along with the associated metadata to a production database. The production database receives 3D production assets from the artist workstations in the form of filepath locations, also referred to herein as a "source path," and associated metadata. Typically, production database stores references to the 3D production assets (such as a filepath location on a disk or other storage medium) rather than the 3D production assets themselves. The production database stores the data and metadata related to the 3D production assets on one or more data stores. The production database maintains a list of the available 3D production assets, including 3D data and metadata associated with the 3D production assets.

A production asset management system retrieves an editorial cut including one or more 3D production assets from production database. The production asset management system transmits the editorial cut, including the 3D production assets, to an editorial workstation. The editorial workstation generates an asset list and transmits the asset list to the production asset management system. Upon receiving the asset list from the editorial workstation 108, the production asset management system transmits a request associated with the asset list to production database to request any and all available information about each 3D production asset included in and/or associated with the asset list received from the editorial workstation.

The production asset management system receives metadata regarding the 3D production assets included in the asset list from production database 104. The production asset management system generates a content library based on the asset list received from production database and causes the content library to be displayed on a display of the editorial workstation. The production asset management system receives a selection of a 3D production asset from the editorial workstation. The selection may be related to a version or variant of a 3D production asset that is different from the version or variant of the 3D production asset included in a frame that is currently displayed on the editorial workstation. Additionally or alternatively, the user may select a 3D production asset that is not related to any of the 3D production assets that are currently displayed on the editorial workstation.

The production asset management system transmits all available information about the selected 3D production asset to the editorial workstation, based on the related metadata. The production asset management system generates an updated content library that references the newly added 3D production asset to the editorial workstation. The updated content library includes information regarding the new version or variant that replaced a 3D production asset currently included in the editorial cut. Additionally or alternatively, the updated content library includes information regarding the new 3D production asset that has been added to the editorial cut.

The production asset management system causes the updated content library to be displayed on a display of the editorial workstation. The editorial workstation adds the 3D production asset to the current frame of the editorial cut. If the 3D production asset is a different version or variant of a 3D production asset currently displayed in the frame, then the editorial workstation replaces the currently displayed 3D production asset with the different version or variant of the 3D production asset. If the 3D production asset is a new 3D production asset that is not currently displayed in the frame, then editorial workstation 108 adds the new 3D production asset to the frame.

At least one technical advantage of the disclosed techniques relative to the prior art is that, with the disclosed techniques, editorial cuts include 3D data and metadata for each of the 3D production assets included in the editorial cut. Therefore, the editorial staff can access each of the individual 3D production assets included in an editorial cut, rather than being limited to having access only to 2D rendered frames. As a result, the editorial staff can directly review and exchange different versions of individual 3D production assets during editorial review. Further, the editorial staff can search for and add new 3D production assets to an editorial cut that are not already in the cut by directly accessing the 3D production assets from a production database. Using a specialized user interface, editorial staff can then separately access and combine different versions of the 3D production assets included in an editorial cut. Thus, the editorial staff is relieved from having to communicate with or involve other members of the production team when changing which 3D production assets are included in a given editorial cut. Further, the production team is relieved from having to generate a 2D rendered layer for the 3D production assets to composite into the editorial cut. As a result, the editorial review process is made more efficient and less labor intensive relative to prior art approaches. Accordingly, these advantages represent one or more technological improvements over prior art approaches.

1. In some embodiments, a computer-implemented method for automatically exposing three-dimensional (3D) production assets when generating editorial cuts in a content creation pipeline comprises: transmitting, to an editorial workstation, a first 3D production asset and a first content library that includes first metadata associated with the first 3D production asset, wherein a first version of the first 3D production asset is included in an editorial cut, and the first metadata allows a user to see what versions of the first 3D production asset are available for incorporation into the editorial cut; retrieving second metadata associated with a second version of the first 3D production asset from a production database; retrieving, based on at least a portion of the second metadata, the second version of the first 3D production asset from the production database; and transmitting the second version of the first 3D production asset to the editorial workstation for incorporation into the editorial cut.

2. The computer-implemented method according to clause 1, further comprising transmitting, to the editorial workstation, a second content library that includes the second metadata.

3. The computer-implemented according to clause 1 or clause 2, further comprising: receiving, from the editorial workstation, an asset list associated with a second 3D production asset that is not included in the editorial cut; retrieving third metadata associated with the second 3D production asset from the production database; retrieving, based on at least a portion of the third metadata, the second 3D production asset from the production database; and transmitting the second 3D production asset to the editorial workstation for incorporation into the editorial cut.

4. The computer-implemented method according to any of clauses 1-3, further comprising transmitting, to the editorial workstation, a second content library that includes the third metadata, wherein the third metadata allows a user to see what versions of the second 3D production asset are available for incorporation into the editorial cut.

5. The computer-implemented method according to any of clauses 1-4, further comprising: receiving an indication that the second 3D production asset has been added to the editorial cut; and transmitting a message to the production database indicating that the second 3D production asset has been added to the media production.

6. The computer-implemented method according to any of clauses 1-5, wherein the editorial workstation replaces the first version of the first 3D production asset with the second version of the first 3D production asset in the editorial cut.

7. The computer-implemented method according to any of clauses 1-6, wherein the second metadata includes a source path that indicates a location associated with the production database where the second version of the first 3D production asset may be retrieved.

8. The computer-implemented method according to any of clauses 1-7, wherein at least one of the first metadata and the second metadata specifies a task associated with the first 3D production asset that is to be performed.

9. In some embodiments, a non-transitory computer-readable medium includes instructions that, when executed by a processor, cause the processor to perform the steps of: transmitting, to an editorial workstation, a first 3D production asset and a first content library that includes first metadata associated with the first 3D production asset, wherein a first version of the first 3D production asset is included in an editorial cut, and the first metadata allows a user to see what versions of the first 3D production asset are available for incorporation into the editorial cut; retrieving second metadata associated with a second version of the first 3D production asset from a production database; retrieving, based on at least a portion of the second metadata, the second version of the first 3D production asset from the production database; and transmitting the second version of the first 3D production asset to the editorial workstation for incorporation into the editorial cut.

10. The non-transitory computer-readable medium according to clause 9, further comprising transmitting, to the editorial workstation, a second content library that includes the second metadata.

11. The non-transitory computer-readable medium according to clause 9 or clause 10, further comprising: receiving, from the editorial workstation, an asset list associated with a second 3D production asset that is not included in the editorial cut; retrieving third metadata associated with the second 3D production asset from the production database; retrieving, based on at least a portion of the third metadata, the second 3D production asset from the production database; and transmitting the second 3D production asset to the editorial workstation for incorporation into the editorial cut.

12. The non-transitory computer-readable medium according to any of clauses 9-11, further comprising transmitting, to the editorial workstation, a second content library that includes the third metadata, wherein the third metadata allows a user to see what versions of the second 3D production asset are available for incorporation into the editorial cut.

13. The non-transitory computer-readable medium according to any of clauses 9-12, wherein the first 3D production asset is associated with a first version of the editorial cut, and further comprising: receiving an indication that the second 3D production asset has been added to the editorial cut; and storing, via the production database, a file that includes details regarding a second version of the editorial cut including the indication that the second 3D production asset has been added.

14. The non-transitory computer-readable medium according to any of clauses 9-13, wherein the first metadata includes a first version number associated with the first version of the first 3D production asset, and the second metadata includes a second version number associated with the second version of the first 3D production asset.

15. The non-transitory computer-readable medium according to any of clauses 9-14, wherein at least one of the first metadata and the second metadata comprises a history of versions of the first 3D production asset including the first version and the second version.

16. In some embodiments, a computing device comprises: a memory that includes instructions, and a processor that is coupled to the memory and, when executing the instructions, is configured to: stream, via a streaming service, a first 3D production asset and a first content library that includes first metadata associated with the first 3D production asset to an editorial workstation, wherein a first version of the first 3D production asset is included in an editorial cut, and the first metadata allows a user to see what versions of the first 3D production asset are available for incorporation into the editorial cut; retrieve second metadata associated with a second version of the first 3D production asset from a production database; retrieve, based on at least a portion of the second metadata, the second version of the first 3D production asset from the production database; and transmit the second version of the first 3D production asset to the editorial workstation for incorporation into the editorial cut.

17. The computing device according to clause 16, wherein the processor, when executing the instructions, is further configured to: receive, from the editorial workstation, an asset list associated with a second 3D production asset that is not included in the editorial cut; retrieve third metadata associated with the second 3D production asset from the production database; retrieve, based on at least a portion of the third metadata, the second 3D production asset from the production database; and transmit the second 3D production asset to the editorial workstation for incorporation into the editorial cut.

18. The computing device according to clause 16 or clause 17, wherein the processor, when executing the instructions, is further configured to: receive an asset list associated with a second 3D production asset that is not included in the editorial cut; retrieve third metadata associated with the second 3D production asset from the production database; retrieve, based on at least a portion of the third metadata, the second 3D production asset from the production database; and transmit the second 3D production asset to the editorial workstation; wherein the editorial workstation adds the second 3D production asset to the editorial cut.

19. The computing device of according to any of clauses 16-18, wherein the processor, when executing the instructions, is further configured to stream, via the streaming service, a second content library to the editorial workstation that includes the third metadata, wherein the third metadata allows a user to see what versions of the second 3D production asset are available for incorporation into the editorial cut.

20. The computing device according to any of clauses 16-19, wherein at least one of the first metadata and the second metadata comprises a set of tags, a JavaScript Object Notation (JSON) file, an eXtensible Markup Language (XML) file, or a comma separated value (csv) file.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically exposing three-dimensional (3D) production assets when generating editorial cuts in a content creation pipeline, the method comprising:

transmitting, to an editorial workstation, a first 3D production asset and a first content library that includes first metadata associated with the first 3D production asset, wherein a first version of the first 3D production asset is included in an editorial cut, and the first content library indicates a plurality of versions of the first 3D production asset that are available for incorporation into the editorial cut;

receiving a selection of a second version of the first 3D production asset included in the plurality of versions of the first 3D production asset;

in response to receiving the selection of the second version of the first 3D production asset, retrieving second metadata associated with the second version of the first 3D production asset from a production database;

retrieving, based on at least a portion of the second metadata, the second version of the first 3D production asset from the production database; and transmitting the second version of the first 3D production asset to the editorial workstation for incorporation into the editorial cut.

2. The computer-implemented method of claim 1, further comprising transmitting, to the editorial workstation, a second content library that includes the second metadata.

3. The computer-implemented method of claim 1, further comprising:
   receiving, from the editorial workstation, an asset list associated with a second 3D production asset that is not included in the editorial cut;
   retrieving third metadata associated with the second 3D production asset from the production database;
   retrieving, based on at least a portion of the third metadata, the second 3D production asset from the production database; and
   transmitting the second 3D production asset to the editorial workstation for incorporation into the editorial cut.

4. The computer-implemented method of claim 3, further comprising transmitting, to the editorial workstation, a second content library that includes the third metadata, wherein the second content library indicates a plurality of versions of the second 3D production asset that are available for incorporation into the editorial cut.

5. The computer-implemented method of claim 3, further comprising:
   receiving an indication that the second 3D production asset has been added to the editorial cut; and
   transmitting a message to the production database indicating that the second 3D production asset has been added to the editorial cut.

6. The computer-implemented method of claim 1, wherein the editorial workstation replaces the first version of the first 3D production asset with the second version of the first 3D production asset in the editorial cut.

7. The computer-implemented method of claim 1, wherein the second metadata includes a source path that indicates a location associated with the production database where the second version of the first 3D production asset may be retrieved.

8. The computer-implemented method of claim 1, wherein at least one of the first metadata or the second metadata specifies a task associated with the first 3D production asset that is to be performed.

9. A non-transitory computer-readable medium including instructions that, when executed by a processor, cause the processor to perform the steps of:
   transmitting, to an editorial workstation, a first 3D production asset and a first content library that includes first metadata associated with the first 3D production asset, wherein a first version of the first 3D production asset is included in an editorial cut, and the first content library indicates a plurality of versions of the first 3D production asset that are available for incorporation into the editorial cut;
   receiving a selection of a second version of the first 3D production asset included in the plurality of versions of the first 3D production asset;
   in response to receiving the selection of the second version of the first 3D production asset, retrieving second metadata associated with the second version of the first 3D production asset from a production database;
   retrieving, based on at least a portion of the second metadata, the second version of the first 3D production asset from the production database; and
   transmitting the second version of the first 3D production asset to the editorial workstation for incorporation into the editorial cut.

10. The non-transitory computer-readable medium of claim 9, further comprising transmitting, to the editorial workstation, a second content library that includes the second metadata.

11. The non-transitory computer-readable medium of claim 9, further comprising:
    receiving, from the editorial workstation, an asset list associated with a second 3D production asset that is not included in the editorial cut;
    retrieving third metadata associated with the second 3D production asset from the production database;
    retrieving, based on at least a portion of the third metadata, the second 3D production asset from the production database; and
    transmitting the second 3D production asset to the editorial workstation for incorporation into the editorial cut.

12. The non-transitory computer-readable medium of claim 11, further comprising transmitting, to the editorial workstation, a second content library that includes the third metadata, wherein the second content library indicates a plurality of versions of the second 3D production asset that are available for incorporation into the editorial cut.

13. The non-transitory computer-readable medium of claim 11, wherein the first 3D production asset is associated with a first version of the editorial cut, and further comprising:
    receiving an indication that the second 3D production asset has been added to the editorial cut; and
    storing, via the production database, a file that includes details regarding a second version of the editorial cut including the indication that the second 3D production asset has been added.

14. The non-transitory computer-readable medium of claim 9, wherein the first metadata includes a first version number associated with the first version of the first 3D production asset, and the second metadata includes a second version number associated with the second version of the first 3D production asset.

15. The non-transitory computer-readable medium of claim 9, wherein at least one of the first metadata or the second metadata comprises a history of versions of the first 3D production asset including the first version and the second version.

16. A computing device, comprising:
    a memory that includes instructions, and
    a processor that is coupled to the memory and, when executing the instructions, is configured to:
      transmitting a first 3D production asset and a first content library that includes first metadata associated with the first 3D production asset to an editorial workstation, wherein a first version of the first 3D production asset is included in an editorial cut, and the first content library indicates a plurality of versions of the first 3D production asset that are available for incorporation into the editorial cut;
      receiving a selection of a second version of the first 3D production asset included in the plurality of versions of the first 3D production asset;
      in response to receiving the selection of the second version of the first 3D production asset, retrieve second metadata associated with the second version of the first 3D production asset from a production database;

retrieve, based on at least a portion of the second metadata, the second version of the first 3D production asset from the production database; and transmit the second version of the first 3D production asset to the editorial workstation for incorporation into the editorial cut.

17. The computing device of claim 16, wherein the processor, when executing the instructions, is further configured to:

receive, from the editorial workstation, an asset list associated with a second 3D production asset that is not included in the editorial cut;

retrieve third metadata associated with the second 3D production asset from the production database;

retrieve, based on at least a portion of the third metadata, the second 3D production asset from the production database; and transmit the second 3D production asset to the editorial workstation for incorporation into the editorial cut.

18. The computing device of claim 16, wherein the processor, when executing the instructions, is further configured to:

receive an asset list associated with a second 3D production asset that is not included in the editorial cut;

retrieve third metadata associated with the second 3D production asset from the production database;

retrieve, based on at least a portion of the third metadata, the second 3D production asset from the production database; and transmit the second 3D production asset to the editorial workstation;

wherein the editorial workstation adds the second 3D production asset to the editorial cut.

19. The computing device of claim 18, wherein the processor, when executing the instructions, is further configured to transmit a second content library to the editorial workstation that includes the third metadata, wherein the second content library indicates a plurality of versions of the second 3D production asset that are available for incorporation into the editorial cut.

20. The computing device of claim 16, wherein at least one of the first metadata or the second metadata comprises a set of tags, a JavaScript Object Notation (JSON) file, an eXtensible Markup Language (XML) file, or a comma separated value (csv) file.

\* \* \* \* \*